3,297,546
PREPARATION OF 6-AMINOPENICILLANIC ACID
David A. Johnson, Fayetteville, and Glenn A. Hardcastle, Jr., Syracuse, N.Y., assignors to Bristol-Myers Company, New York, N.Y., a corporation of Delaware
No Drawing. Filed Dec. 9, 1963, Ser. No. 329,218
11 Claims. (Cl. 195—36)

This is a continuation-in-part of application Serial No. 193,321, filed May 8, 1962, and now abandoned.

This invention relates to an improved process for the production of 6-aminopenicillanic acid by the enzymatic degradation of a penicillin. This invention also relates to an improved process for the production of an enzyme preparation capable of enzymatically hydrolyzing penicillins, particularly benzylpenicillin.

Various processes for the production and recovery of 6-aminopenicillanic acid, which has the following structural formula:

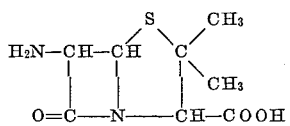

are described in Belgian Patent No. 569,728 and in the scientific literature, particularly in a publication by Batchelor et al. in Nature, 183, pages 257–258, (1959). In such processes, a penicillin-producing mold is grown in a nutrient medium and the 6-aminopenicillanic acid or a salt thereof is isolated from the fermentation liquor obtained. The scientific literature also describes certain processes for producing enzyme preparations which are capable of enzymatically degrading various penicillins to produce 6-aminopenicillanic acid and which are referred to herein as "penicillin amidase"; see United States Patents Nos. 3,014,845 and 3,014,846; Nature 187, 236–238, (1960); J. Am. Chem. Soc., 82, 3790–3791, (1960). All of such prior processes result in a yield of 6-aminopenicillanic acid from benzylpenicillin which is significantly below the theoretical yield. An improved process which would result in higher actual yields of 6-amino-penicillanic acid is therefore theoretically possible though heretofore unknown. Such a process is very desirable in order to reduce 6-aminopenicillanic acid production costs which are of great significance in the production and use of synthetic penicillins.

It is therefore an object of the present invention to provide an improved process for the production of 6-aminopenicillanic acid involving the enzymatic splitting of a penicillin.

It is a further object of the present invention to prepare aqueous solutions of penicillin amidase of increased efficiency and usefulness.

The process of the present invention for the production of 6-aminopenicillanic acid comprises fermenting *Escherichia coli* to produce a penicillin amidase-containing fermentation broth, treating such broth with a metal compound of the type described below and a quaternary ammonium salt of the type described below, isolating the solid materials from the broth after such treatment, dissolving the penicillin amidase contained in or on such solid materials in water to give an aqueous solution of penicillin amidase, removing the remaining solid materials from the aqueous solution of penicillin amidase, contacting the resulting clarified aqueous solution of penicillin amidase with an absorbing agent such as activated carbon and thereafter removing all solid materials from such aqueous solution, and contacting the resulting aqueous solution of penicillin amidase with a penicillin whereby such penicillin is enzymatically hydrolyzed to produce 6-aminopenicillanic acid.

A preferred process of the present invention for the production of an aqueous solution of penicillin amidase of increased efficiency comprises the treatment of a penicillin amidase-containing fermentation broth with (1) a metal compound and (2) a quaternary ammonium salt as described below, isolating the solid materials from the broth after such treatment, dissolving the penicillin amidase contained in or on such solid materials in water, removing the remaining solid materials from the aqueous solution of penicillin amidase, contacting the resulting aqueous solution of penicillin amidase with activated carbon and thereafter removing all undissolved solid materials from such aqueous solution.

In the preparation of a penicillin amidase-containing broth, the procedures known in the prior art can be utilized. Such procedures involve growing *Escherichia coli* in an appropriate nutrient media. The fermentation broth so prepared contains, in addition to penicillin amidase and the residue of the nutrient media, all of the metabolic products of the microorganism as well as the vegetative growth of the microorganism and materials added to the nutrient media to enhance production of penicillin amidase.

According to the present invention, there is added to such a fermentation broth a water-soluble metal compound of the type described below in amounts ranging from about 1 to about 20 grams per liter of the broth. About 2 to 5 grams of the metal compound per liter of broth is preferred. There is also added to the broth a quaternary ammonium salt of a type described below in amounts ranging from about 0.025% to 0.15% by volume of the original broth, (i.e. about 0.25 gm. to 1.5 gms. per liter of the original broth); about 0.05% to 0.10% of such quaternary ammonium salt by volume of the original broth, (i.e. about 0.5 gm. to 1.0 gm. per liter of the original broth) is preferred. It is desirable, but not necessary, to add to the broth from about 2 ml. to about 20 ml. of toluene per liter of the broth; about 5 ml. to about 10 ml. per liter of the broth is preferred. The metal compound, quaternary ammonium salt and toluene can be added separately to the broth and thoroughly mixed therewith, or the toluene and quaternary ammonium salt can first be mixed together and then added to, and mixed with, the broth. It is preferred to first add the metal compound to the broth.

The water-soluble metal compounds which can be used in the process of the present invention are the hydroxides and metal salts containing a divalent metal cation which does not destroy or inhibit penicillin amidase and which preferably have no deleterious effect upon penicillin. Accordingly, such metal cations as mercury, iron and copper are to be avoided. A preferred group of metal compounds which are useful in the process of the present invention are the metal compounds which have the formula $MX_2$ wherein M is a metal cation selected from the group consisting of calcium, barium and magnesium cations, and wherein X is an anion selected from the group consisting of hydroxyl, chloride, nitrate, bromide, acetate and propionate anions. The preferred metal compound is calcium nitrate which is preferably used in amounts of about 2.5 grams per liter of the starting fermentation broth. These metal compounds, or the metallic cation thereof, apparently render penicillin amidase recoverable from the broth with the solid materials, but do not prevent subsequent solubilization of such penicillin amidase in water.

The quaternary ammonium salts which are useful in the process of the present invention are the monoalkyltrimethylammonium chlorides and bromides wherein the alkyl group has from 12 to 18 carbons. The quaternary ammonium salts useful in the process of the present invention are those having the formulae R—M(CH$_3$)$_3$Cl and R—N(CH$_3$)$_3$Br wherein R is a member selected from the group consisting of aliphatic hydrocarbon radicals having from 12 to 18 carbon atoms inclusive. Thus R can be dodecyl, tetradecyl, hexadecyl, octadecyl, octadecenyl and octadecadienyl, and mixtures thereof.

The quaternary ammonium salts described above are in general commercially available; any such salt which is not commercially available can be prepared according to methods described in the technical literature. The quaternary ammonium salts and mixtures thereof are sometimes available in admixture with water, isopropanol or other solvents, and a minor quantity of sodium chloride; such mixtures can be used as a source of the desired quaternary ammonium salt. The preferred quaternary ammonium salt is hexadecyltrimethylammonium chloride.

As soon as possible after the metal compound and quaternary ammonium salt, and toluene if such is used, are mixed with the broth, the solid materials and supernatant are separated, e.g. by filtration or centrifugation, and the supernatant, which ordinarily contains less than 10% of the penicillin amidase originally present in the broth, is discarded. Since penicillin amidase is gradually dissolved in the supernatant, it is desirable to quickly separate the solid materials from the supernatant in order to minimize the loss of penicillin amidase with the supernatant. The major portion, ordinarily in excess of 90%, of the penicillin amidase originally present in the broth is contained in or on the solid materials removed from the supernatant.

The penicillin amidase recovered with the solid materials is dissolved in water, preferably by mixing such solid materials in water. We have found it desirable in effecting solution of the penicillin amidase in this step to use an amount of water equal to from about 10% to 200% of the original volume of the broth. The use of less than equal volumes of water results in concentrating the penicillin amidase solution. Resuspension in a volume of water equivalent to from about ⅕–½ of the original broth volume is preferred. The solid materials are maintained in contact with the water for as long as is necessary for the penicillin amidase to go into solution.

In a preferred process an aqueous suspension of the solid materials is stirred from about 1 to about 24 hours during which time the penicillin amidase contained within or upon such solid materials goes into solution. In those cases where toluene has been previously added to the broth, the time necessary to effect solution of the penicillin amidase is about 2 to 4 hours, i.e., less time than is required in the absence of toluene. After solution of the penicillin amidase is effected, the solid materials are removed from the aqueous suspension, e.g., as by filtration or centrifugation. The solid materials so collected are then washed with water and discarded and the washing water added to the supernatant. It is desirable to collect the solid materials by filtration and to wash the collected solid materials with water in an amount calculated to adjust the concentration of penicillin amidase to the concentration desired in the process of hydrolyzing benzylpenicillin. It is usually desirable to bring the collected supernatant up to about ⅓ of the volume of the original broth.

In the next step there is added to the penicillin amidase-containing supernatant activated carbon in an amount equal to from about 0.2 gram to 2.0 grams per liter of the original fermentation broth; about 0.5 gram to 1.5 grams activated carbon per liter of the original broth is preferred and about 1.0 gram per liter of the original broth is usually used. Other absorbing agents such as aluminum, magnesium, silicate, alkaline earth, and other weak adsorbents may be used in place of the activated carbon, but such other agents are generally less effective than activated carbon. It is frequently desirable at this point, though not absolutely necessary, to add to the supernatant a quaternary ammonium salt of the type described above in an amount equal to from about 0.2 to 10.0 grams per liter of the supernatant; about 1 to 3 grams per liter of the quaternary ammonium salt based on the volume of the supernatant is preferred and about 2 grams per liter customarily used. Use of the quaternary ammonium salt is desirable at this point in the process if the aqueous solution is turbid. The mixture is then mixed as necessary to secure a thorough dispersion of the activated carbon and the quaternary ammonium salt (if any salt is used) throughout the supernatant and to allow adsorbable materials to be absorbed upon the activated carbon. The activated carbon and any other solid materials in the supernatant are then removed from the supernatant, e.g., as by filtration or centrifugation. The resulting supernatant is an essentially pure aqueous solution of penicillin amidase which may be used in the hydrolysis of benzylpenicillin.

In the hydrolysis step a natural or biosynthetic penicillin, preferably benzylpenicillin, is added to the penicillin amidase solution and the resulting hydrolysis reaction mixture is adjusted to a temperature of 20° to 45° C., preferably 30° to 40° C., and a pH of 6.5 to 9.0 and preferably to a pH of about 8 and maintained under such conditions for from about 1 to 30 hours. Since the pH of the reaction mixture tends to drop during the hydrolysis reaction, it may be necessary to make appropriate pH adjustments during the course of the hydrolysis reaction. The penicillins which may be used in the process of this invention are the natural penicillins, e.g., penicillin K and the biosynthetic penicillins having an α-methylene group in the acyl side chain. The biosynthetic penicillins which are most useful are those produced by adding a penicillin precursor to a penicillin fermentation broth. The preferred penicillins are benzylpenicillin are phenoxymethylpenicillin.

After termination of the enzymatic hydrolysis, the 6-aminopenicillanic acid can be recovered from the hydrolysate by known methods. In a preferred method for the isolation and recovery of 6-aminopenicillanic acid, the hydrolysate is acidified to about pH 2 and filtered and any unreacted penicillin and the phenylacetic acid which is split off during the reaction removed from the filtrate by extraction with an organic solvent, e.g., methyl isobutyl ketone, n-butanol or butyl acetate, at an acid pH, e.g., pH 2 to 3. The 6-aminopenicillanic acid can then be precipitated as described in U.S. Patent No. 2,941,995 or removed from the purified solution as described in U.S. Patent No. 3,008,956.

It is desirable that fermentation broth after harvest should be cooled to less than about 40° C. and that all process solutions, suspensions and materials should be maintained at less than 40° C. throughout all subsequent steps prior to use of the penicillin amidase in the hydrolyzing procedures. It is preferable to maintain the temperature of all process solutions and materials at from about 5° C. to about 20° C.

The penicillin amidase-containing fermentation broth at harvest ordinarily has a pH of about 9. It is desirable that the broth, the solid materials obtained from the broth, the aqueous suspensions of solid materials obtained from the broth and the aqueous solutions obtained from the broth be maintained at a pH not less than 6 and not more than 10. In cases where calcium nitrate is used in the first step a pH adjustment ordinarily is not required. If the metallic ion used in the first step is introduced in a basic form, e.g., as a base such as a metal hydroxide, it may be necessary to add an acidifying agent, e.g., dilute aqueous hydrochloric acid to lower the pH. Conversely, if such a metallic ion is introduced in an acid form, e.g., as a salt such as a metal chloride, it may be necessary to raise the pH by the addition to the broth of a base, e.g., dilute aqueous sodium hydroxide.

The addition of toluene to the whole broth in the step wherein calcium nitrate is added to the whole broth serves to reduce the time necessary to dissolve penicillin amidase from the mat. While it is desirable to use from about 2 to about 20 ml. of toluene per liter of broth in this step as pointed out above, more toluene can be used but serves no useful purpose.

The following examples will serve to illustrate this invention without limiting it thereto.

*Example 1*

Escherichia coli is fermented under submerged aerobic conditions to produce 71.5 gallons (about 271 liters) of whole fermentation broth containing 2500 penicillin amidase units per ml. One "penicillin amidase unit" is the amount of penicillin amidase which will produce 1 mcg. of 6-aminopenicillanic acid in three hours at 35° C. by hydrolysis of potassium benzylpenicillin in an aqueous solution containing 3% potassium benzylpenicillin by weight. To this whole broth there is added 3,369 ml. of a 25% aqueous solution of calcium nitrate (contains 3.4 lbs. of calcium nitrate per gallon), 280 gm. of orthobenzylparachlorophenol, 280 gm. of cetyltrimethylammonium bromide (0.967 gm. per liter of broth; about 0.1% by volume of the broth) and 946 ml. of toluene. The broth with the added materials is stirred for 15 minutes, filtered and the solid materials washed with 75 liters of water. The solid wet mat recovered weighs 9988 gms. and assays about 54% water.

*Example 2*

A 100 gm. portion of the wet mat obtained as described in Example 1 above is suspended in 200 ml. of a 2% potassium phosphate buffer solution at pH 7.5. To this suspension is added 6 gm. of potassium benzylpenicillin. The resulting mixture is stirred for 17 hours at 35° C., filtered and washed with water until the filtrate amounts to 630 ml. The content of 6-aminopenicillanic acid in the filtrate is determined and it is found that the actual yield of 6-aminopenicillanic acid from potassium benzylpenicillin is about 67% of the theoretical yield.

*Example 3*

A 3.455 kg. portion of the wet mat obtained from the procedure of Example 1 above is slurried in water (about 3.8 liters) for 24 hours and then filtered.

*Part A.*—To one 500 ml. portion of the filtrate, there is added 15 gm. potassium benzylpenicillin and the resulting mixture is stirred for 6 hours at 35° C. and at a pH ranging from 7.5 to 8.5, the pH being maintained by the intermittent addition of 10% aqueous sodium hydroxide. At the conclusion of the 6 hour hydrolysis period, the content of 6-aminopenicillanic acid in the hydrolysis reaction mixture is measured and it is determined that the yield of 6-aminopenicillanic acid from penicillin G is 74% of the theoretical yield.

*Part B.*—To a second 500 ml. portion of the filtrate, there is added 5 gm. of activated carbon (Darco KB) and the resulting mixture is stirred for 15 minutes and then filtered. Six grams of potassium benzylpenicillin is added to a 200 ml. portion of the resulting colorless filtrate to form a hydrolysis reaction mixture which is then maintained at a pH of from 7.5 to 8.0 for 6 hours at 35° C., the pH being maintained by the intermittent addition to the reaction mixture of 10% aqueous sodium hydroxide. At the conclusion of the 6-hour hydrolysis period, the content of 6-aminopenicillanic acid in the hydrolysis reaction mixture is measured and it is determined that the yield of 6-aminopenicillanic acid from penicillin G is 90% of the theoretical yield.

*Part C.*—The procedure of Part B above is repeated using 4 gm. of potassium benzylpenicillin in place of the 6 gm. The yield of 6-aminopenicillanic acid from potassium penicillin G is 90% of the theoretical yield.

*Example 4*

A fermentation broth is prepared by the fermentation of Escherichia coli under submerged aerobic conditions according to conventional procedures and found to contain 5,270 penicillin amidase units per ml. The following experiments show the effect of use of various amounts of quaternary ammonium salt.

*Part A.*—A solution of 2.5 gm. calcium nitrate dihydrate dissolved in 6 ml. of water is added to 1 liter of such fermentation broth. After mixing, the broth is filtered and the filtered mat washed with 150 ml. water. The filtered mat is then suspended in 200 ml. of water to which is added 5 ml. of toluene and the suspension is stirred for 3 hours. After stirring, the suspension is filtered and the collected solid materials washed with 100 ml. of water. The filtrate is stirred with 1 gm. activated carbon (Darco KB) and 1.2 ml. of "Quaternary Ammonium Salt Mixture No. I." "Quaternary Ammonium Salt Mixture No. I" is commercially available from Armour and Company of Chicago, Illinois, under the trademark "Arquad 16–50" and is a liquid quaternary ammonium salt mixture containing, by weight, about 45% hexadecyltrimethylammonium chloride, about 3% octadecyltrimethylammonium chloride, about 2% octadecenyltrimethylammonium chloride, about 35% isopropanol, about 14% water and about 1% sodium chloride.

After thorough mixing, all solid materials are removed from the mixture by filtration and there is obtained 280 ml. of an essentially pure aqueous solution of penicillin amidase assaying 1950 penicillin amidase units per ml. and containing about 10% of the penicillin amidase originally present in the broth.

*Part B.*—To a one-liter portion of such fermentation broth is added a solution of 2.5 gm. calcium nitrate dihydrate dissolved in 6 ml. of water and 3 ml. of a solution containing 10 ml. toluene and 4 ml. of Quaternary Ammonium Salt Mixture No. I. After mixing, the broth is filtered and the filtered mat washed with 150 ml. water. The filtered mat is then suspended in 200 ml. of water to which is added 5 ml. of toluene and the suspension is stirred for three hours. After stirring, the suspension is filtered and the collected solid materials washed with 100 ml. of water. The filtrate is stirred with 1 gm. activated carbon (Darco KB) and 1.2 ml. of Quaternary Ammonium Salt Mixture No. I.

After thorough mixing, all solid materials are removed from the mixture by filtration and there is obtained 350 ml. of an essentially pure aqueous solution of penicillin amidase assaying 9590 penicillin amidase units per ml. and containing about 64% of the penicillin amidase originally present in the broth.

*Part C.*—The procedure of Part B is repeated using 9 ml. instead of 3 ml. of the toluene-quaternary ammonium salt solution; the 9 ml. contains about 1.3 gm. quaternary ammonium salt. The process yields 300 ml. of an essentially pure aqueous solution of penicillin amidase containing 500 penicillin amidase units per ml. or about 2.9% of the penicillin amidase present in the original liter of fermentation broth.

*Part D.*—The procedure of Part B is repeated using 6 ml. instead of 3 ml. of the toluene-quaternary ammonium salt solution. The process yields 298 ml. of an essentially pure aqueous solution of penicillin amidase containing 10,470 penicillin amidase units per ml. or about 59% of the penicillin amidase present in the original liter of fermentation broth.

*Part E.*—The procedure of Part B is repeated using 7 ml. instead of 3 ml. of the toluene-quaternary ammonium salt solution. The process yields 318 ml. of an essentially pure aqueous solution of penicillin amidase containing 9900 penicillin amidase units per ml. or about 59.7% of the penicillin amidase present in the original liter of fermentation broth.

*Part F.*—The procedure of Part B is repeated using 7 ml. instead of 3 ml. of the toluene-quaternary ammonium salt solution which is added to the aqueous suspension of the whole mat rather than to the broth prior to the filtration step wherein the mat is obtained from the fermentation broth. The process yields 310 ml. of an essentially pure aqueous solution of penicillin amidase containing 5390 penicillin amidase units per ml. which is about 32% of the penicillin amidase present in the original liter of fermentation broth.

*Example 5*

A fermentation broth is prepared by the fermentation of *Escherichia coli* under submerged aerobic conditions according to conventional procedures and found to contain 6,690 penicillin amidase units per ml.

*Part A.*—To a one-liter portion of such fermentation broth is added a solution of 2.5 gm. calcium nitrate dihydrate dissolved in 6 ml. of water and 2 ml. of Quaternary Ammonium Salt Mixture No. I. After mixing, the broth is filtered and the filtered mat washed with 150 ml. of water. The filtered mat is then suspended with stirring in 250 ml. of water for 3 hours. The suspension is then filtered and the filtered mat washed with 200 ml. water. The filtrate is then stirred with 1 gm. activated carbon (Darco KB) and 1.8 ml. Quaternary Ammonium Salt Mixture No. I. After thorough mixing, all solid materials are removed from the mixture by filtration and there is obtained 440 ml. of an essentially pure aqueous solution of penicillin amidase having 2,940 penicillin amidase units per ml. which is about 19% of the penicillin amidase present in the original liter of the fermentation broth.

*Part B.*—The procedure of Part A is repeated except that 5 ml. toluene is added to the whole broth at the time the calcium nitrate dihydrate is added. The process yields 430 ml. of an essentially pure aqueous solution of penicillin amidase containing 6,730 penicillin amidase units per ml. which is about 43% of the penicillin amidase present in the orignal liter of the fermentation broth.

*Part C.*—The procedure of Part B is repeated except that the 2 ml. of Quaternary Ammonium Salt Mixture No. I is omitted. The process yields 400 ml. of an essentially pure aqueous solution of penicillin amidase containing 1,610 penicillin amidase units per ml. which is about 10% of the penicillin amidase present in the original liter of the fermentation broth.

*Part D.*—The procedure of Part B is repeated except that the 2 ml. Quaternary Ammonium Salt Mixture No. I is replaced by 2 ml. of a quaternary ammonium salt mixture containing by weight about 4% octyltriethylammonium chloride, 4½% decyltrimethylammonium chloride, 23½% dodecyltrimethylammonium chloride, 9% tetradecyltriethylammonium chloride, 4% hexadecyltrimethylammonium chloride, 2½% octadecyltrimethylammonium chloride, 2½% octadecenyltrimethylammonium chloride, 1% sodium chloride, 36% isopropanol and 13.5% water. The process yields 320 ml. of an essentially pure aqueous solution of penicillin amidase containing 6,370 penicillin amidase units per ml. which is about 31% of the penicillin amidase present in the original liter of the fermentation broth.

*Example 6*

*Part A.*—A 6.91 kg. portion of wet mat obtained as described in Example 1 above is suspended in water (about 7.5 liters) for 24 hours with stirring and then filtered. A 3784 ml. portion of filtrate is mixed with 1% activated carbon by weight of the filtrate and filtered. To 1348 ml. of the filtrate (following the carbon treatment) is added 1.9 gram orthobenzylparachlorophenol and 56.8 gm. of potassium benzylpenicillin in 546 ml. of water. The reaction mixture is stirred for 17 hours at 95° F. and pH 8, the pH being maintained at pH 8 by addition of aqueous sodium hydroxide as required. At the end of the 17 hour reaction period, the reaction mixture contains 14,920 mcg/ml. of 6-aminopenicillanic acid (86% of theoretical yield) and 5300 Oxford units per ml. of benzylpenicillin (11% of the total penicillin added to the reaction mixture); a sample of the reaction mixture is withdrawn for use as described in Part B and the reaction continued for an additional four hours. At the end of the 21-hour reaction period, the reaction mixture contains 15,590 mcg./ml. of 6-aminopenicillanic acid (89.6% of theoretical yield) and 3270 Oxford units of benzylpenicillin (6.8% of the total penicillin added to the reaction mixture). A 200 ml. portion of such 21-hour reaction medium is adjusted to pH 2 with sulfuric acid, extracted with methyl isobutyl ketone and adjusted to pH 4 with 10% aqueous sodium hydroxide. 6-Aminopenicillanic acid is crystallized over a 4-hour period, and then collected by filtration, dried and found to weigh 2.05 gm. The procedure results in a yield of 6-aminopenicillanic acid equal to a yield of 59% of theoretical yield from benzylpenicillin of 6-aminopenicillanic acid.

*Part B.*—A 500 ml. portion of the aqueous reaction mixture taken after 17 hours hydrolysis as described in Part A above is adjusted to pH 2 with aqueous sulfuric acid and extracted with methyl isobutyl ketone. After such extraction, the aqueous layer is adjusted to pH 7 and vacuum concentrated to 100 ml. The 100 ml. concentrate is adjusted to pH 4 with 4 N hydrochloric acid, and the 6-aminopenicillanic acid crystallized therefrom over a 4-hour period at pH 4. The precipitated 6-aminopenicillanic acid is collected by filtration, dried, found to weigh 6.30 gm., and to assay 980 mcg./mg. The procedure results in a yield of 6-aminopenicillanic acid equal to 71% of theoretical yield.

This application is a continuation-in-part of our prior copending application Serial No. 193,321, filed May 8, 1962.

We claim:
1. A process for the production of penicillin amidase which comprises the steps of:
   (1) adding to a penicillin amidase-containing fermentation broth both a quaternary ammonium salt and a metal compound having a divalent metallic cation to cause the adsorption of water-soluble penicillin amidase on the water-insoluble solids present in said broth;
   (2) separating said solids having penicillin amidase adsorbed thereon;
   (3) mixing said solids with water whereby penicillin amidase is transferred from said solids to solution in said water;
   (4) separating the aqueous solution of penicillin amidase thereby produced from said solids;
   (5) adding to said aqueous solution a solid adsorbing agent incapable of adsorbing penicillin amidase; and
   (6) removing said solid adsorbent from said aqueous solution to provide a purified aqueous solution of penicillin amidase.

2. A process for the production of penicillin amidase which comprises the steps of:
   (1) adding to a penicillin amidase-containing fermentation broth both a quaternary ammonium salt and a metal compound selected from the group consisting of metal hydroxides and metal salts having a divalent metallic cation whereby said penicillin amidase is caused to be affixed to the water-soluble solids present in said broth;
   (2) separating the water-insoluble solid present;
   (3) mixing said water-insoluble solids with water whereby the penicillin amidase is dissolved in said water;
   (4) separating the water-insoluble solids from the aqueous solution of penicillin amidase;
   (5) adding to said aqueous solution of penicillin amidase a solid adsorbing agent incapable of adsorbing penicillin amidase; and (6) removing all water-insoluble solids from said mixture to provide an essentially pure aqueous solution of penicillin amidase.

3. A process for the production of an aqueous solution of penicillin amidase which comprises the steps of:
(1) growing a culture of *Escherichia coli* to produce a penicillin amidase-containing fermentation broth;
(2) adding to said fermentation broth
(a) about 2.5 grams calcium nitrate per liter of said fermentation broth;
(b) about 0.8 gram hexadecyltrimethylammonium chloride per liter of said fermentation broth; and
(c) about 5 ml. toluene per liter of said fermentation broth;
(3) separating the solid materials contained within said fermentation broth from the liquid part of said fermentation broth after the addition to said fermentation broth of the aforesaid calcium nitrate, toluene and hexadecyltrimethylammonium chloride;
(4) mixing said solid materials with water whereby the penicillin amidase part of said solid materials is dissolved in said water;
(5) separating the supernatant from the resulting mixture of water and said solid materials;
(6) adding to said supernatant
(a) about 1 gram of activated carbon per liter of said fermentation broth; and
(b) about 2 grams hexadecyltrimethylammonium chloride per liter of said supernatant; and
(7) filtering all solid materials from said supernatant to produce a filtrate which is an essentially pure aqueous solution of penicillin amidase.

4. A process for the production of an aqueous solution of penicillin amidase which comprises the steps of:
(1) adding to a penicillin amidase-containing fermentation broth
(a) from about 2 to 5 grams per liter of said fermentation broth, of a metal compound selected from the group of compounds having the formula $MX_2$ wherein M is a metal cation selected from the group consisting of calcium, barium, and magnesium cations, and wherein X is an anion selected from the group consisting of hydroxyl, chloride, nitrate, bromide, acetate and propionate anions;
(b) from about 0.5 to 1 gram per liter of said fermentation broth of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive; and
(c) from about 5 to 10 ml. toluene per liter of said fermentation broth;
(2) separating the solid materials contained within said fermentation broth from the liquid part of said fermentation broth after the addition to said fermentation broth of the aforesaid metal compound, toluene and quaternary ammonium salt;
(3) mixing said solid material with water whereby the penicillin amidase part of said solid materials is dissolved in said water;
(4) separating the supernatant from the resulting mixture of water and said solid materials;
(5) adding to said supernatant
(a) activated carbon in an amount equal to 0.5 to 1.5 grams per liter of said fermentation broth; and
(b) from about 1 to 3 grams per liter of said supernatant of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive;
(6) removing essentially all solid materials from said supernatant which is an essentially pure aqueous solution of penicillin amidase.

5. A process for the production of an aqueous solution of penicillin amidase which comprises the steps of:
(1) adding to a penicillin amidase-containing fermentation broth
(a) from about 2 to 20 grams per liter of said fermentation broth, of a metal compound selected from the group of compounds having the formula $MX_2$ wherein M is a metal cation selected from the group consisting of calcium, barium and magnesium cations, and wherein X is an anion selected from the group consisting of hydroxyl, chloride, nitrate, bromide, acetate and propionate anions;
(b) from about 0.25 to 1.5 grams per liter of said fermentation broth of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive; and
(c) from about 2 to 20 ml. toluene per liter of said fermentation broth;
(2) separating the solid materials contained within said fermentation broth from the liquid part of said fermentation broth after the addition to said fermentation broth of the aforesaid metal compound, toluene and quaternary ammonium salt;
(3) mixing said solid materials with water whereby the penicillin amidase part of said solid materials is dissolved in said water;
(4) separating the supernatant from the resulting mixture of water and said solid materials;
(5) adding to said supernatant
(a) activated carbon in an amount equal to 0.2 to 2 grams per liter of said fermentation broth; and
(b) from about 0.2 to 10 grams per liter of said supernatant of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive;
(6) removing essentially all solid materials from said supernatant which is an essentially pure aqueous solution of penicillin amidase.

6. A process for the production of an aqueous solution of penicillin amidase which comprises the steps of:
(1) adding to a penicillin amidase-containing fermentation broth
(a) from about 1 to 20 grams per liter of said fermentation broth, of a metal compound selected from the group of compounds having the formula $MX_2$ wherein M is a metal cation selected from the group consisting of calcium, barium and magnesium cations, and wherein X is an anion selected from the group consisting of hydroxyl, chloride, nitrate, bromide, acetate and propionate anions; and
(b) from about 0.25 to 1.5 grams per liter of said fermentation broth of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive;

(2) separating the solid materials contained within said fermentation broth from the liquid part of said fermentation broth after the addition to said fermentation broth of the aforesaid metal compound and quaternary ammonium salt;
(3) mixing said solid materials with water whereby the penicillin amidase part of said solid materials is dissolved in said water;
(4) separating the supernatant from the resulting mixture of water and said solid materials;
(5) adding to said supernatant activated carbon in an amount equal to 0.2 to 2 grams per liter of said broth; and
(6) removing essentially all solid materials from said supernatant which is an essentially pure aqueous solution of penicillin amidase.

7. A process for the production of penicillin amidase which comprises the steps of:
 (1) adding to a penicillin amidase-containing fermentation broth
  (a) from about 1 to 20 grams per liter of said fermenteation broth, of a metal compound selected from the group consisting of metal hydroxides and metal salts having a divalent metallic cation; and
  (b) from about 0.25 to 1.5 grams per liter of said fermentation broth of a quaternary ammonium salt selected from the group of quaternary ammonium salts have the formulae R–N(CH$_3$)$_3$Cl and R–N(CH$_3$)$_3$Br wherein R is a member selected from the group consisting of aliphatic hydrocarbon radicals having from 12 to 18 carbon atoms inclusive;
 (2) separating the undissolved solid materials within said fermentation broth from the liquid part of said fermentation broth after the addition to said fermentation broth of the aforesaid metal compound and quaternary ammonium salt;
 (3) mixing said undissolved solid materials with water whereby the penicillin amidase part of said solid materials is dissolved in said water;
 (4) separating the supernatant from the resulting mixture of water and said undissolved solid materials;
 (5) adding a solid absorbing agent to said supernatant; and
 (6) removing essentially all undissolved solid materials from said supernatant which is an essentially pure aqueous solution of penicillin amidase.

8. A process for the production of 6-aminopenicillanic acid which comprises the steps of:
 (1) growing a culture of *Escherichia coli* to produce a penicillin amidase-containing fermentation broth;
 (2) adding to said fermentation broth
  (a) about 2.5 grams calcium nitrate per liter of said fermentation broth;
  (b) about 0.8 gram hexadecyltrimethylammonium chloride per liter of said fermentation broth; and
  (c) about 5 ml. toluene per liter of said fermentation broth;
 (3) separating the solid materials contained within said fermentation broth from the liquid part of said fermentation broth after the addition to said fermentation broth of the aforesaid calcium nitrate, toluene and hexadecyltrimethylammonium chloride;
 (4) mixing said solid materials with water whereby the penicillin amidase part of said solid materials is dissolved in said water;
 (5) separating the supernatant from the resulting mixture of water and said solid materials;
 (6) adding to said supernatant
  (a) about 1 gram of activated carbon per liter of said fermentation broth; and
  (b) about 2 grams hexadecyltrimethylammonium chloride per liter of said supernatant;
 (7) removing essentially all solid materials from said supernatant;
 (8) adding benzylpenicillin to said supernatant to provide an aqueous reaction mixture containing essentially benzylpenicillin and penicillin amidase; and
 (9) maintaining said aqueous reaction mixture at a temperature of from about 30° C. to 40° C. and a pH of about 8 for a period of from about 3 to 30 hours whereby the benzylpenicillin in said aqueous reaction mixture is enzymatically hydrolyzed to produce 6-aminopenicillanic acid.

9. A process for the production of 6-aminopenicillanic acid which comprises the steps of:
 (1) fermenting *Escherichia coli* to produce a penicillin amidase-containing fermentation broth;
 (2) adding to said fermentation broth
  (a) from about 2 to 5 grams per liter of said fermentation broth, of a metal compound selected from the group of compounds having the formula MX$_2$ wherein M is a metal cation selected from the group consisting of calcium, barium and magnesium cations, and wherein X is an anion selected from the group consisting of hydroxyl, chloride, nitrate, bromide, acetate and propionate anions; and
  (b) from about 0.5 to 1 gram per liter of said fermentation broth of a quaternary ammonium salt selected from the group of quaternary ammonium salts having the formulae R—N(CH$_3$)$_3$Cl and R—N(CH$_3$)$_3$Br wherein R is a member selected from the group consisting of aliphatic hydrocarbon radicals having from 12 to 18 carbon atoms inclusive; and
  (c) from about 5 to 10 ml. toluene per liter of said fermentation broth;
 (3) separating the solid materials contained within said fermentation broth from the liquid part of said fermentation broth after the addition to said fermentation broth of the aforesaid metal compound, toluene and quaternary ammonium salt;
 (4) mixing said solid materials with water whereby the penicillin amidase part of said solid materials is dissolved in said water;
 (5) separating the supernatant from the resulting mixture of water and said solid materials;
 (6) adding to said supernatant
  (a) activated carbon in an amount equal to 0.5 to 1.5 grams per liter of said fermentation broth;
  (b) from about 1 to 3 grams per liter of said supernatant of a quaternary ammonium salt selected from the group of quaternary ammonium salts having the formulae R—N(CH$_3$)$_3$Cl and R—N(CH$_3$)$_3$Br wherein R is a member selected from the group consisting of aliphatic hydrocarbon radicals having from 12 to 18 carbon atoms inclusive:
 (7) removing essentially all solid materials from said supernatant;
 (8) adding benzylpenicillin to said supernatant to provide an aqueous reaction mixture containing essentially benzylpenicillin and penicillin amidase; and
 (9) maintaining said aqueous reaction mixture at a temperature of from about 20° C. to 45° C. and a pH of from about 6.5 to about 9 for a period of from about 3 to 30 hours whereby the benzylpenicillin in said aqueous reaction mixture is enzymatically hydrolyzed to produce 6-aminopenicillanic acid.

10. A process for the production of 6-aminopenicillanic acid which comprises the steps of:
 (1) fermenting *Escherichia coli* to produce a penicillin amidase-containing fermentation broth;

(2) adding to said fermentation broth
   (a) from about 2 to 20 grams per liter of said fermentation broth, of a metal compound selected from the group of compounds having the formula $MX_2$ wherein M is a metal cation selected from the group consisting of calcium, barium and magnesium cations, and wherein X is an anion selected from the group consisting of hydroxyl, chloride, nitrate, bromide, acetate and propionate anions;
   (b) from about 0.25 to 1.5 grams per liter of said fermentation broth of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive; and
   (c) from about 2 to 20 ml. toluene per liter of said fermentation broth;
(3) separating the solid materials contained within said fermentation broth from the liquid part of said fermentation broth after the addition to said fermentation broth of the aforesaid metal compound, toluene and quaternary ammonium salt;
(4) mixing said solid materials with water whereby the penicillin amidase part of said solid materials is dissolved in said water;
(5) separating the supernatant from the resulting mixture of water and said solid materials;
(6) adding to said supernatant
   (a) activated carbon in an amount equal to 0.2 to 2 grams per liter of said fermentation broth;
   (b) from about 0.2 to 10 grams per liter of said supernatant of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive;
(7) removing essentially all solid materials from said supernatant;
(8) adding a penicillin selected from the group consisting of n-heptylpenicillin, benzylpenicillin and phenoxymethylpenicillin to said supernatant to provide an aqeuous reaction mixture containing essentially penicillin and penicillin amidase; and
(9) maintaining said aqueous reaction mixture at a temperature of from about 20° C. to 45° C. and a pH of from about 6.5 to about 9 for a period of from about 3 to 30 hours whereby said penicillin selected from the group consisting of n-heptylpenicillin, benzylpenicillin and phenoxymethylpenicillin in said aqueous reaction mixture is enzymatically hydrolyzed to produce 6-aminopenicillanic acid.

11. A process for the production of 6-aminopenicillanic acid which comprises the steps of:
(1) fermenting *Escherichia coli* to produce a penicillin amidase-containing fermentation broth;
(2) adding to said fermentation broth
   (a) from about 1 to 20 grams per liter of said fermentation broth, of a metal compound selected from the group of compounds having the formula $MX_2$ wherein M is a metal cation selected from the group consisting of calcium, barium and magnesium cations, and wherein X is an anion selected from the group consisting of hydroxyl, chloride, nitrate, bromide, acetate and propionate anions; and
   (b) from about 0.25 to 1.5 grams per liter of said fermentation broth of a quaternary ammonium salt selected from the group of quaternary ammonium salts having the formulae $R-N(CH_3)_3Cl$ and $R-N(CH_3)_3Br$ wherein R is a member selected from the group consisting of aliphatic hydrocarbon radicals having from 12 to 18 carbon atoms inclusive;
(3) separating the solid materials contained within said fermentation broth from the liquid part of said fermentation broth after the addition to said fermentation broth of the aforementioned metal compound and quaternary ammonium salt;
(4) mixing said solid materials with water whereby the penicillin amidase part of said solid materials is dissolved in said water;
(5) separating the supernatant from the resulting mixture of water and said solid materials;
(6) adding to said supernatant activated carbon in an amount equal to 0.2 to 2 grams per liter of said fermentation broth;
(7) removing essentially all solid materials from said supernatant;
(8) adding a penicillin having an α-methylene group in the acyl side chain to said supernatant to provide an aqueous reaction mixture containing essentially said penicillin and penicillin amidase; and
(9) maintaining said aqueous reaction mixture at a temperature of from about 20° C. to 45° C. and a pH of from about 6.5 to about 9 for a period of from about 1 to 30 hours whereby said penicillin in said aqueous reaction mixtures is enzymatically hydrolyzed to produce 6-aminopenicillanic acid.

References Cited by the Examiner
UNITED STATES PATENTS 3,116,218 12/1963 Kaufman et al. _____ 195—36
3,127,326 3/1964 Lindner et al. _____ 196—36

A. LOUIS MONACELL, *Primary Examiner.*

D. M. STEPHENS, *Assistant Examiner.*